United States Patent
Lu et al.

(10) Patent No.: US 10,232,386 B1
(45) Date of Patent: Mar. 19, 2019

(54) USER-FRIENDLY WATER DISCHARGE DEVICE WITH PAUSE STRUCTURE

(71) Applicant: Xiamen Easo Co., Ltd., Xiamen, Fujian (CN)

(72) Inventors: Huibin Lu, Xiamen (CN); Shixiong Lin, Xiamen (CN); Ximin Chen, Xiamen (CN)

(73) Assignee: XIAMEN EASO CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/834,024

(22) Filed: Dec. 6, 2017

(51) Int. Cl.
| F16K 21/04 | (2006.01) |
| B05B 1/30 | (2006.01) |
| B05B 1/34 | (2006.01) |
| B05B 12/00 | (2018.01) |

(52) U.S. Cl.
CPC ............... B05B 1/30 (2013.01); B05B 1/34 (2013.01); B05B 12/002 (2013.01); F16K 21/04 (2013.01)

(58) Field of Classification Search
CPC ....................................... B05B 1/30
USPC ..................................... 4/596–614
See application file for complete search history.

(56) References Cited

U.S. PATENT DOCUMENTS

| 5,608,927 A * | 3/1997 | Lowry | ............... A47K 3/28 |
| | | | 239/193 |
| 5,744,033 A * | 4/1998 | Bertrand | ............ B01D 35/043 |
| | | | 137/625.5 |

* cited by examiner

*Primary Examiner* — Lori Baker
(74) *Attorney, Agent, or Firm* — Leong C. Lei

(57) ABSTRACT

A user-friendly water discharge device with a pause structure includes a valve body, a valve core front cover, a gasket, a push block, a magnet, an iron push rod, and a button. The valve core front cover has a water inlet chamber and an inner chamber. The water inlet chamber is provided with a drain hole. The button is pressed and cooperates with a magnetic structure to close or open a through hole of the gasket to achieve a pause function, such that the water can only slightly flow out from the drain hole. It is convenient for operation. The button may be pressed again to open the waterway. There is no need to spend time in re-adjusting the temperature of the water.

10 Claims, 5 Drawing Sheets

USER-FRIENDLY WATER DISCHARGE DEVICE WITH PAUSE STRUCTURE

BACKGROUND OF THE INVENTION

1. Field of the Invention

The present invention relates to a shower device, and more particularly to a user-friendly water discharge device with a pause structure.

2. Description of the Prior Art

There are various water discharge devices on the market, such as rain shower heads, handheld shower heads, faucets, etc. During use, users often need to shut off the water temporarily. After a moment, the water discharge device is turned on again. For example, the user needs to shut off the water temporarily for smearing shower gel and then turn on the water discharge device again. When the water discharge device is turned on again, the water temperature cannot be lasted, and it is necessary to re-adjust the water temperature. The water temperature may be too low or too high when the water discharge device is turned on again, affecting the feeling of use.

In general, a shower column on the market usually includes two kinds of waterways, a handheld shower head and a rain shower head. With the improvement of the living standard and the rapid development of technology, the requirements for taking a shower are more and more. A conventional shower column is provided with a knob for switching the waterways. When the user wants to interrupt the water, he/she can only control the water discharge switch handle. Once the water discharge switch handle is opened again, the angle of the handle must be adjusted for temperature control. This way wastes water and is inconvenient for use. The other one has complex switch functions. Although the operation is convenient, the installation is inconvenient, the cost is high, and it needs to adjust the temperature each time.

Accordingly, the inventor of the present invention has devoted himself based on his many years of practical experiences to solve these problems.

SUMMARY OF THE INVENTION

The primary object of the present invention is to provide a user-friendly water discharge device with a pause structure. The user-friendly water discharge device can be operated conveniently, and there is no need to spend time in readjusting the temperature of water.

In order to achieve the aforesaid object, a user-friendly water discharge device with a pause structure of the present invention comprises a valve body and a valve core front cover, a gasket, a push block, a magnet, an iron push rod and a button which are fitted in the valve body. The valve body has a water inlet and at least one water outlet. The valve core front cover has a water inlet chamber communicating with the water inlet. The water inlet chamber is provided with a drain hole communicating with the water outlet of the valve body. The valve core front cover further has an inner chamber communicating with the water outlet. One end of the gasket is fitted in the water inlet chamber and a top of the inner chamber of the valve core front cover. The gasket has a through hole corresponding to the inner chamber and a water inlet hole communicating with the water inlet chamber. Another end of the gasket is connected to one end of the push block. A water storage chamber is formed between the push block and the gasket. The iron push rod is disposed on the push block corresponding in position to the through hole of the gasket. The button is mated with another end of the push block. One end of the button, mated with the push block, is provided with the magnet. The button is fitted to an end of the valve body.

Preferably, the button includes a valve core rear cover, a switch front shaft, a switch rear shaft, a button spring, and a button frame. One end of the switch front shaft and one end of the switch rear shaft are disposed in the valve core rear cover. Another end of the switch rear shaft extends out of the valve core rear cover and is fixed to the button frame. The switch front shaft includes a plurality of spaced guide ribs thereon. The valve core rear cover has a plurality of guide grooves to mate with the guide ribs. The switch rear shaft is provided with a plurality of teeth corresponding to the guide ribs of the switch front shaft. The magnet is disposed at one end of the switch front shaft, facing the push block. The button spring is disposed between the switch front shaft and the push block.

Preferably, the button frame and the switch rear shaft are fixed together by a screw. The button frame is mated with a decorative cover.

Preferably, the gasket is provided with a frame corresponding in position to the inner chamber. The frame has a first perforation and a second perforation corresponding to the through hole and the water inlet hole of the gasket respectively.

Preferably, a gasket spring is provided between the frame and the push block. One end of the gasket spring is integrally formed with a pin. The pin is fitted in the water inlet hole of the gasket and the second perforation of the frame.

Preferably, a fastening screw is provided between a side wall of the valve body and the valve core rear cover. The side wall of the valve body is formed with a locking hole. The fastening screw is screwed to the locking hole. The fastening screw is mated with a screw cover.

Preferably, the valve body comprises a three-way main body and a knob connected to one end of the three-way main body. The valve core front cover, the gasket, the push block, the magnet, the iron push rod and the button are disposed in the end of the three-way main body and the knob. The button is disposed at one end of the knob. The three-way main body includes the water inlet and two water outlets. The valve core front cover is mated with and fixed to the knob. The valve core front cover is provided with a rotary pad for sealing the water outlet.

Preferably, a positioning gasket is provided between the three-way main body and the knob for sealing and connecting the three-way main body and the knob. The valve core front cover is mated with and fixed to the knob through a rotating gasket.

Preferably, the positioning gasket is formed with a plurality of indication grooves corresponding to water discharge modes. A ball spring is fixed to the knob. One end of the ball spring is connected to a ball.

Preferably, one end of the iron push rod, facing the gasket, is covered with a plastic plug.

In the present invention, the through hole of the gasket is closed or opened by pressing the button in cooperation with the magnetic structure of the magnet and the iron push rod to achieve a pause function, such that the water can only slightly flow out from the drain hole. It is convenient for operation. The button may be pressed again to open the waterway. There is no need to spend time in re-adjusting the temperature of the water. The present invention has a simple structure and a low cost, and can improve the user experience.

The operation of the present invention is described hereinafter. When the button is not pressed, the waterway is in a flowing state. The water flows from the water inlet of the valve body to the water inlet chamber of the valve core front cover. The gasket is deformed by the water flow so that a gap is formed between the gasket and the valve core front cover. A part of the water in the water inlet chamber flows into the inner chamber through the gap between the gasket and the valve core front cover, and the other part of the water flows into the water storage chamber through the water inlet hole of the gasket, and the water will fill the water storage chamber. Since there is a certain distance between the iron push rod and the through hole of the gasket, the through hole is not blocked, and the water flows from the through hole to the inner chamber. That is to say, when the waterway is in a flowing state, the water in the water inlet chamber and the water in the water storage chamber flow to the inner chamber simultaneously and then flow from the inner chamber to the water outlet for use. When the water needs to be paused, the button is pressed. The button is moved inward to drive the magnet to move at the same time. The iron push rod is attracted by the magnet to move along with the magnet until the plastic plug blocks the through hole. The through hole is blocked. The water inlet hole continues to have water inflow without draining until the water storage chamber is in an airtight state. The water pressure is balanced, and the water flow cannot deform the gasket. The through hole of the gasket is blocked, that is, the water flow is blocked to form a pause state. At this time, the water can only flow out of the drain hole of the valve core front cover.

Furthermore, the button of the present invention adopts a ratchet mechanism. The button is similar to the button structure of an automatic ballpoint pen through the guide grooves of the valve core rear cover, the guide ribs of the switch front shaft, the teeth of the switch rear shaft, and the button spring. The button is capable of self-licking after the button frame is pressed. After the button frame is pressed, the switch front shaft is held by the valve core rear cover, the button frame is retained, the button spring is compressed, and the switch front shaft is in a ready state. After the button frame is pressed again, the switch front shaft is pushed and rotated by the switch rear shaft. The switch front shaft is switched back to the original position by the button spring while being rotated so that the respective structures are returned.

The valve body of the present invention may adopt a three-way main body. For example, the valve body is used on a shower column having a rain shower head and a handheld shower head. The three-way main body has a water inlet and two water outlets. The two water outlets can be arranged at 180° angle and correspond to two waterways. When the valve core front cover is in communication with water, the knob can be used to switch the two waterways. When the pad blocks one of the water outlets, the other waterway is open. Based on this state, when the knob is further rotated clockwise or counterclockwise by 90°, the pad does not block the two water outlets. The two waterways are open. When the knob is rotated to any position, the button may be pressed to interrupt the waterway temporarily.

DETAILED DESCRIPTION OF THE PREFERRED EMBODIMENTS

Figure 1:
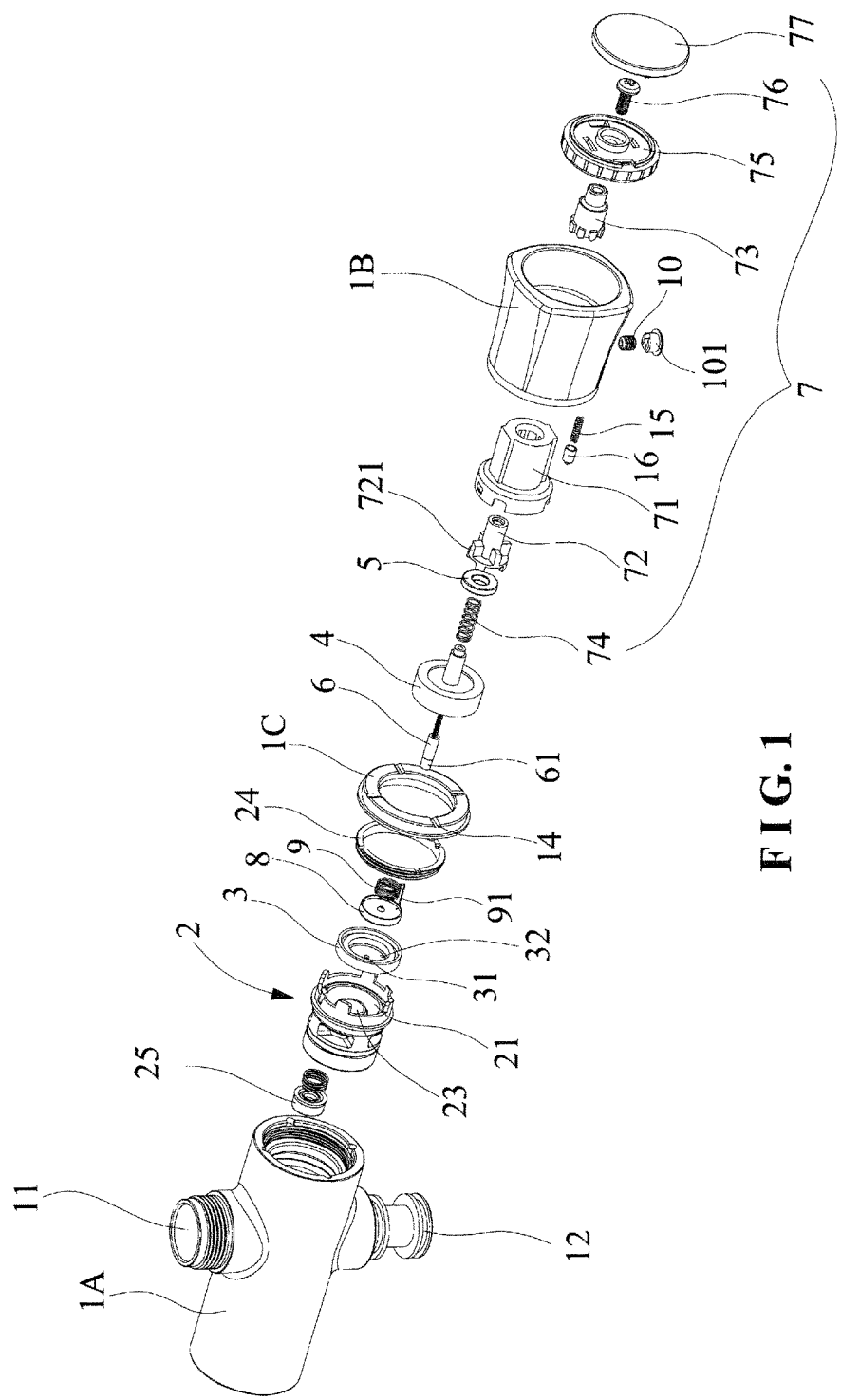
FIG. 1 is an exploded view of the present invention.

Embodiments of the present invention will now be described, by way of example only, with reference to the accompanying drawings.

As shown in FIG. 1 to FIG. 4, the present invention discloses a user-friendly water discharge device with a pause structure. The water discharge device comprises a valve body 1, and a valve core front cover 2, a gasket 3, a push block 4, a magnet 5, an iron push rod 6 and a button 7 which are fitted in the valve body 1. The valve body 1 has a water inlet 11 and at least one water outlet 12. The valve core front cover 2 has a water inlet chamber 21 communicating with the water inlet 11. The water inlet chamber 21 is provided with a drain hole 22 communicating with the water outlet 12 of the valve body 1. The valve core front cover 2 further has an inner chamber 23 communicating with the water outlet 12. One end of the gasket 3 is fitted in the water inlet chamber 21 and the top of the inner chamber 23 of the valve core front cover 2. The gasket 3 has a through hole 31 corresponding to the inner chamber 23 and a water inlet hole 32 communicating with the water inlet chamber 21. Another end of the gasket 3 is connected to one end of the push block 4. A water storage chamber A is formed between the push block 4 and the gasket 3. The iron push rod 6 is disposed on the push block 4 corresponding in position to the through hole 31 of the gasket 3. One end of the iron push rod 6, facing the gasket 3, is covered with a plastic plug 61. The button 7 is mated with another end of the push block 4. One end of the button 7, mated with the push block 4, is provided with the magnet 5. The button 7 is fitted to an end of the valve body 1.

Figure 3:
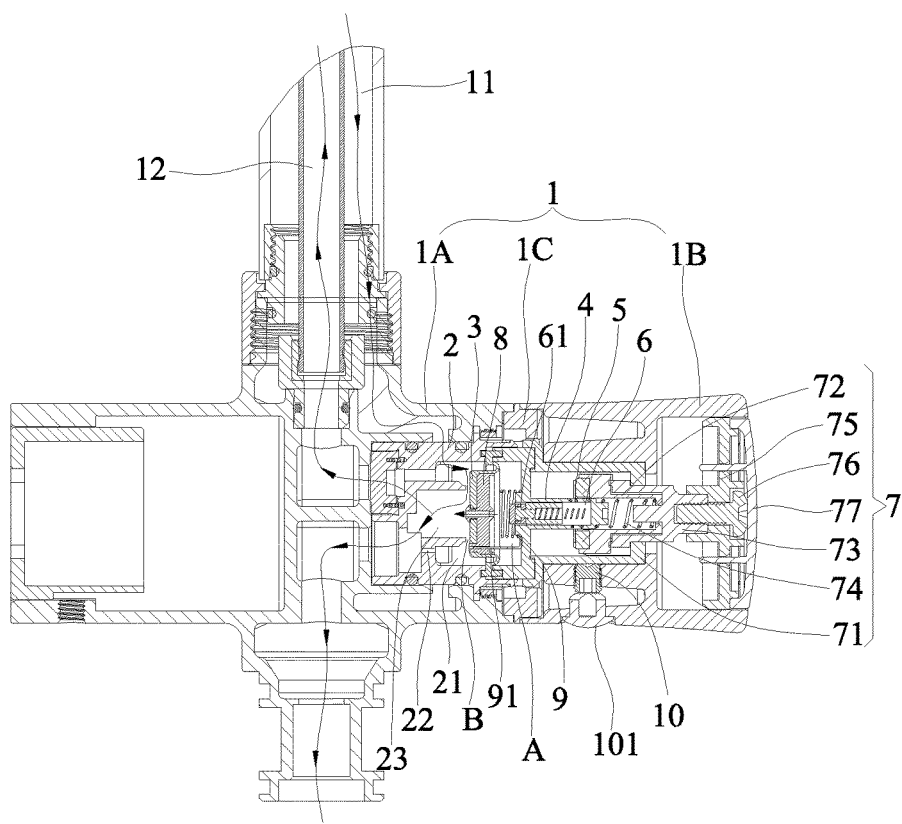
FIG. 3 is an assembled sectional view of the present invention (the water is in a flowing state)
Figure 4:
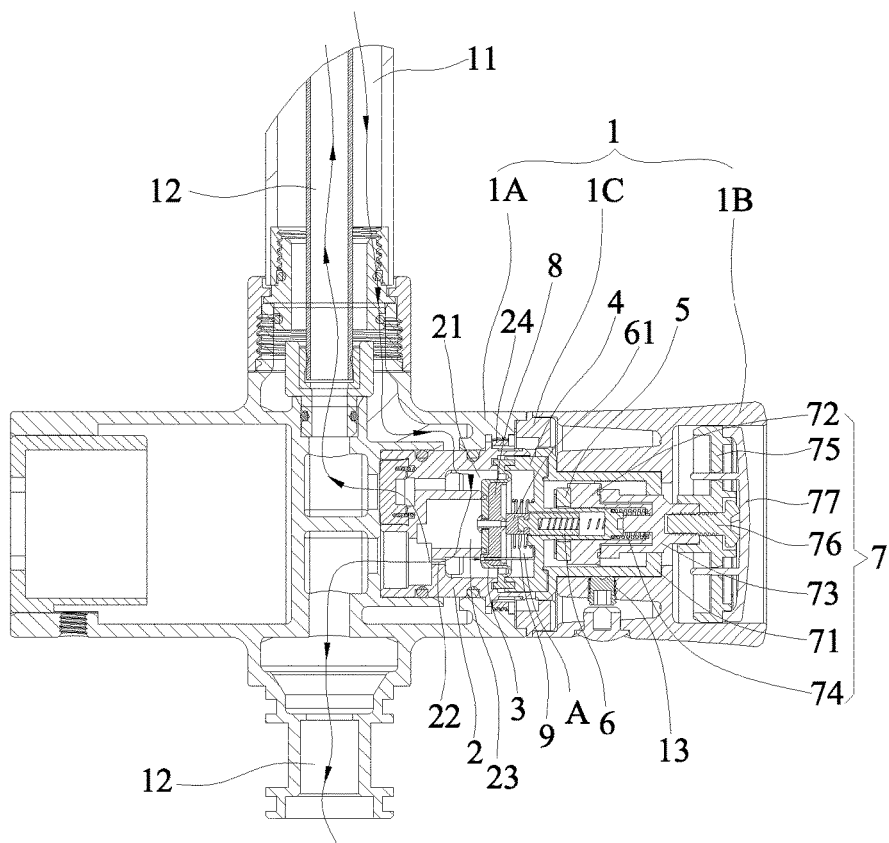
FIG. 4 is an assembled sectional view of the present invention (the water is in a pause state)

The operation of the present invention is described hereinafter. As shown in FIG. 3, when the button 7 is not pressed, the waterway is in a flowing state. The water flows from the water inlet 11 of the valve body 1 to the water inlet chamber 21 of the valve core front cover 2. The gasket 3 is deformed by the water flow so that a gap B is formed between the gasket 3 and the valve core front cover 2. A part of the water in the water inlet chamber 21 flows into the inner chamber 23 through the gap B between the gasket 3 and the valve core front cover 2, and the other part of the water flows into the water storage chamber A through the water inlet hole 32 of the gasket 3, and the water will fill the water storage chamber A. Since there is a certain distance between the iron push rod 6 and the through hole 31 of the gasket 3, the through hole 31 is not blocked, and the water flows from the through hole 31 to the inner chamber 23. That is to say, when the waterway is in a flowing state, the water in the water inlet chamber 21 and the water in the water storage chamber A flow to the inner chamber 23 simultaneously and then flow from the inner chamber 23 to the water outlet 12 for use. As shown in FIG. 4, when the water needs to be paused, the button 7 is pressed. The button 7 is moved inward to drive the magnet 5 to move at the same time. The iron push rod 6 is attracted by the magnet 5 to move along with the magnet 5 until the plastic plug 61 blocks the through hole 31. The through hole 31 is blocked. The water inlet hole 32 continues to have water inflow without draining until the water storage chamber A is in an airtight state. The water pressure is balanced, and the water flow cannot deform the gasket 3. The through hole 31 of the gasket 3 is blocked, that is, the water flow is blocked to form a pause state. At this time, the water can only flow out of the drain hole 22 of the valve core front cover 2. In the present invention, the through hole 31 of the gasket 3 is closed or opened by pressing the button 7 in cooperation with the magnetic structure of the magnet 5 and the iron push rod 6 to achieve a pause function, such that the water can only slightly flow out from the drain hole 22. It is convenient for operation. The button 7 may be pressed again to open the waterway. There is no need to spend time in re-adjusting the temperature of water, thereby improving the user experience.

Figure 2:
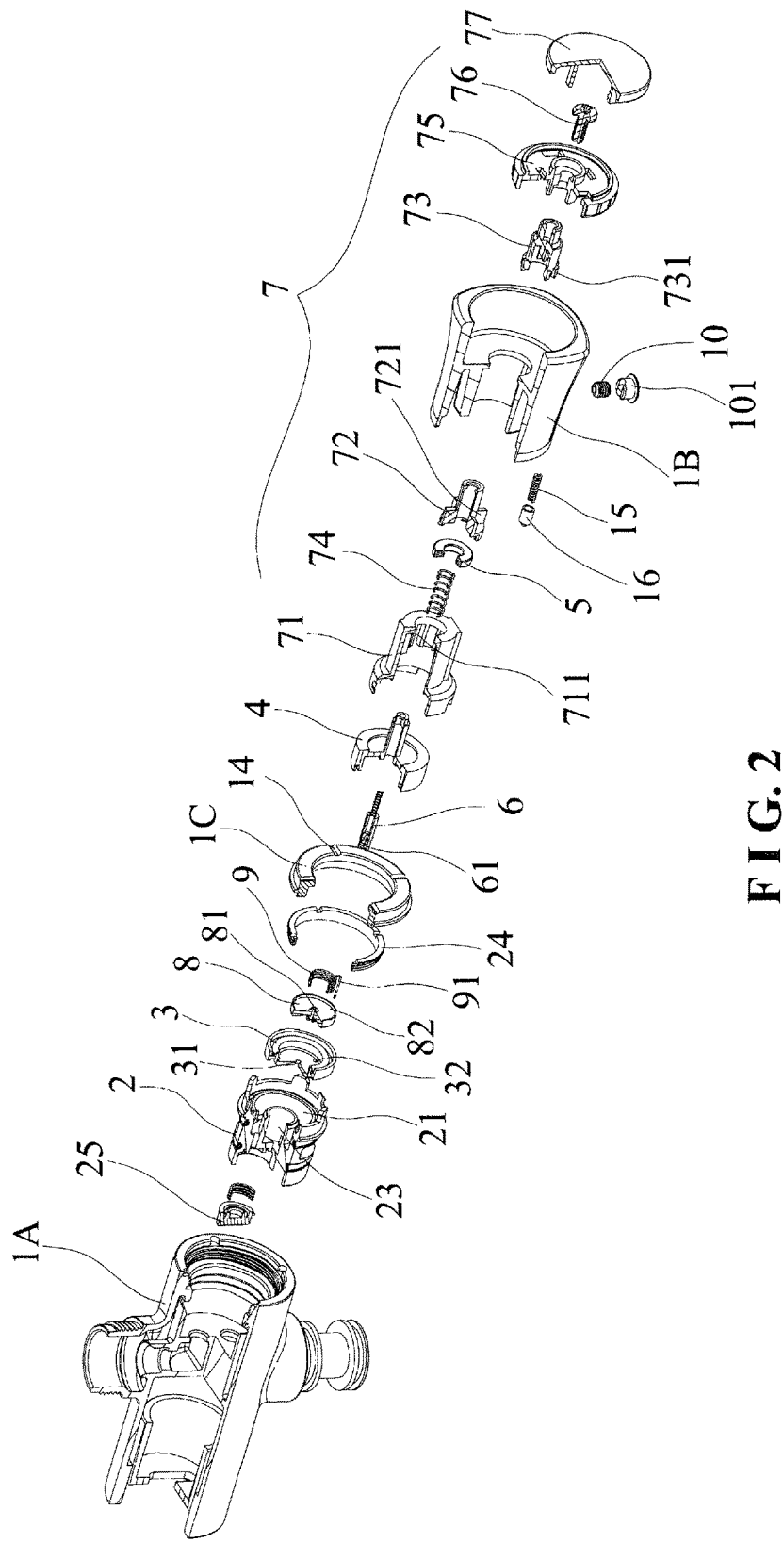
FIG. 2 is an exploded sectional view (quarter-section) of the present invention.
Figure 5:
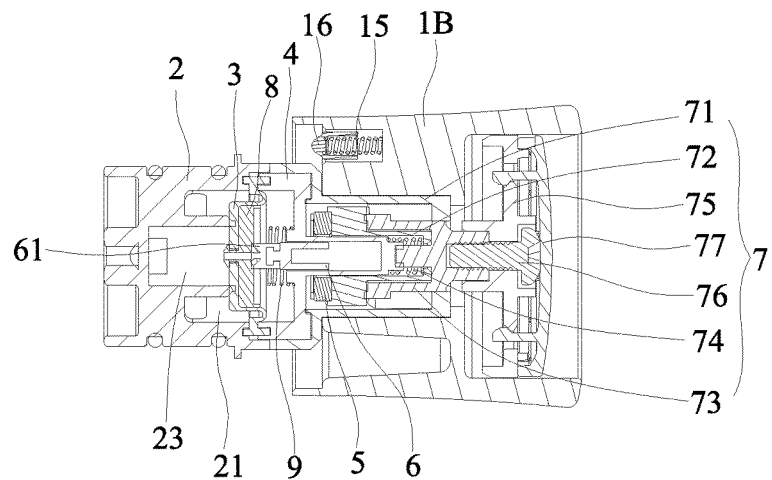
FIG. 5 is a schematic view showing the operation of the button the present invention (in a press state)
Figure 6:
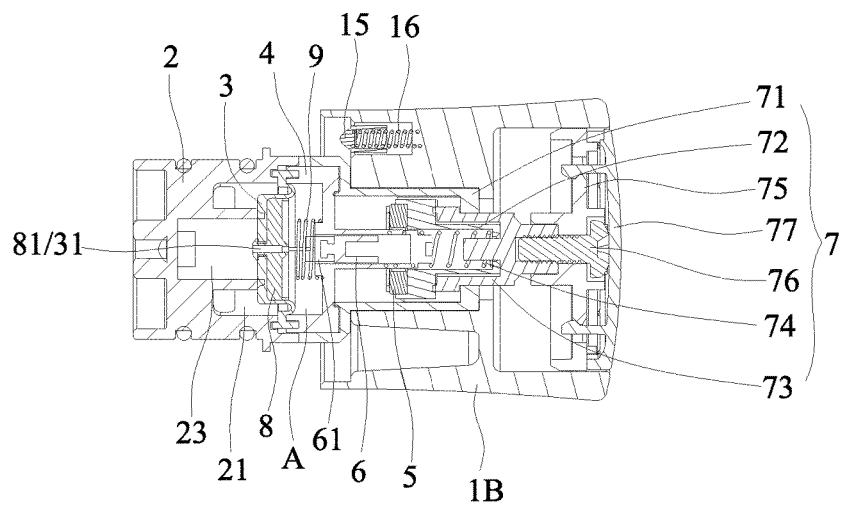
FIG. 6 is a schematic view showing the operation of the button the present invention (in a return state).

As shown in FIG. 5 and FIG. 6, the button 7 of the present invention adopts a ratchet mechanism. The button 7 includes a valve core rear cover 71, a switch front shaft 72, a switch rear shaft 73, a button spring 74, and a button frame 75. One end of the switch front shaft 72 and one end of the switch rear shaft 73 are disposed in the valve core rear cover 71. Another end of the switch rear shaft 73 extends out of the valve core rear cover 71 and is fixed to the button frame 75. The switch front shaft 72 includes a plurality of spaced guide ribs 721 thereon. The valve core rear cover 71 has a plurality of guide grooves 711 (as shown in FIG. 2) to mate with the guide ribs 721. The switch rear shaft 73 is provided with a plurality of teeth 731 corresponding to the guide ribs 721 of the switch front shaft 72. The magnet 5 is disposed at one end of the switch front shaft 72, facing the push block 4. The button spring 74 is disposed between the switch front shaft 72 and the push block 4. The button frame 75 and the switch rear shaft 73 may be fixed together by a screw 76. The button frame 75 may be mated with a decorative cover 77 to make the exterior of the button 7 more aesthetically pleasing. The button 7 is similar to the button structure of an automatic ballpoint pen through the guide grooves 711 of the valve core rear cover 71, the guide ribs 721 of the switch front shaft 72, the teeth 731 of the switch rear shaft 73, and the button spring 74. The button 7 is capable of self-licking after the button frame 75 is pressed. As shown in FIG. 5, after the button frame 75 is pressed, the switch front shaft 72 is held by the valve core rear cover 71, the button frame 75 is retained, the button spring 74 is compressed, and the switch front shaft 72 is in a ready state. As shown in FIG. 6, after the button frame 75 is pressed again, the switch front shaft 72 is pushed and rotated by the switch rear shaft 73. The switch front shaft 72 is switched back to the original position by the button spring 74 while being rotated so that the respective structures are returned.

After the button 7 is pressed and the iron push rod 6 blocks the through hole 31 of the gasket 3, in order to prevent the gasket 3 from being deformed, the gasket 3 is provided with a rigid frame 8 corresponding in position to the inner chamber 23. The frame 8 has a first perforation 81 and a second perforation 82 corresponding to the through hole 31 and the water inlet hole 32 of the gasket 3 respectively. In addition, a gasket spring 9 is provided between the frame 8 and the push block 4. One end of the gasket spring 9 is integrally formed with a pin 91. The pin 91 is fitted in the water inlet hole 32 of the gasket 3 and the second perforation 82 of the frame 8. When the water flow deforms the gasket 3, the water inlet hole 32 of the gasket 3 is moved laterally. Since the pin 91 of the gasket spring 9 is inserted into the water inlet hole 32, the water inlet hole 32 is moved laterally relative to the stroke of the gasket spring 9, thereby providing a function of descaling so as to prevent the water inlet hole 32 from being blocked by scale, particles and the like.

In addition, a fastening screw 10 is provided between the side wall of the valve body 1 and the valve core rear cover 71. The side wall of the valve body 1 is formed with a locking hole 13. The fastening screw 10 is screwed to the locking hole 13. The fastening screw 10 is mated with a screw cover 101.

In the present invention, the valve body comprises a three-way main body 1A and a knob 1B connected to one end of the three-way main body 1A. The valve body 1 can be used on a shower column having a rain shower head and a handheld shower head. A positioning gasket 1C is provided between the three-way main body 1A and the knob 1B for sealing and connecting the three-way main body 1A and the knob 1B. The valve core front cover 2, the gasket 3, the push block 4, the magnet 5, the iron push rod 6 and the button 7 are disposed in the end of the three-way main body 1A and the knob 1B. The button 7 is disposed at the end of the knob 1B. The three-way main body 1A includes a water inlet 11 and two water outlets 12. The valve core front cover 2 is mated with and fixed to the knob 1B. The valve core front cover 2 is mated with and fixed to the knob 1B through a rotating gasket 24. The valve core front cover 2 is provided with a rotary pad 25 for sealing the water outlet.

Further, the positioning gasket 1C is formed with a plurality of indication grooves 14 corresponding to the water discharge modes. A ball spring 15 is fixed to the knob 1B. One end of the ball spring 15 is connected to a ball 16.

The three-way main body 1A has a water inlet 11 and two water outlets 12. The two water outlets 12 can be arranged at 180° angle and correspond to two waterways. When the valve core front cover 2 is in communication with water, the knob 1B can be used to switch the two waterways. When the pad 25 blocks one of the water outlets, the other waterway is open. Based on this state, when the knob is further rotated clockwise or counterclockwise by 90°, the pad 25 does not block the two water outlets 12. The two waterways are open. When the knob 1B is rotated to any position, the button 7 may be pressed to interrupt the waterway temporarily.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water discharge device with a pause structure, comprising a valve body and a valve core front cover, a gasket, a push block, a magnet, an iron push rod and a button fitted in the valve body; wherein the valve body has a water inlet and at least one water outlet, the valve core front cover has a water inlet chamber which is in communication with the water inlet, the water inlet chamber has a drain hole which is in communication with the water outlet of the valve body, the valve core front cover further has an inner chamber which is in communication with the water outlet, one end of the gasket is fitted in the water inlet chamber and a top of the inner chamber of the valve core front cover, the gasket has a through hole in alignment with the inner chamber and a water inlet hole which is in communication with the water inlet chamber, another end of the gasket is connected to one end of the push block, a water storage chamber is formed between the push block and the gasket, the iron push rod is disposed on the push block in alignment with the through hole of the gasket, the button is mated with another end of the push block, one end of the button which is mated with the push block is mounted with the magnet, the button is fitted to an end of the valve body.

2. The water discharge device as claimed in claim 1, wherein the button includes a valve core rear cover, a switch front shaft, a switch rear shaft, a button spring and a button frame, one end of the switch front shaft and one end of the switch rear shaft are disposed in the valve core rear cover, another end of the switch rear shaft extends out of the valve core rear cover and is fixed to the button frame, the switch front shaft includes a plurality of spaced guide ribs thereon, the valve core rear cover has a plurality of guide grooves to mate with the guide ribs, the switch rear shaft has a plurality of teeth in alignment with the guide ribs of the switch front shaft, the magnet is disposed at one end of the switch front shaft, facing the push block, and the button spring is disposed between the switch front shaft and the push block.

3. The water discharge device as claimed in claim 2, wherein the button frame and the switch rear shaft are fixed by a screw, and the button frame is mated with a decorative cover.

4. The water discharge device as claimed in claim 1, wherein the gasket has a frame in alignment with the inner chamber, and the frame has a first perforation and a second perforation in alignment with the through hole and the water inlet hole of the gasket respectively.

5. The water discharge device as claimed in claim 4, wherein a gasket spring is mounted between the frame and the push block, one end of the gasket spring has a pin, and the pin is fitted in the water inlet hole of the gasket and the second perforation of the frame.

6. The water discharge device as claimed in claim 2, wherein a fastening screw is mounted between a side wall of the valve body and the valve core rear cover, the side wall of the valve body is formed with a locking hole, the fastening screw is screwed to the locking hole, and the fastening screw is mated with a screw cover.

7. The water discharge device as claimed in claim 1, wherein the valve body comprises a three-way main body and a knob connected to one end of the three-way main body, the valve core front cover, the gasket, the push block, the magnet, the iron push rod and the button are disposed in the end of the three-way main body and the knob, the button is disposed at one end of the knob, the three-way main body includes the water inlet and two water outlets, the valve core front cover is mated with and fixed to the knob, and the valve core front cover has a rotary pad for sealing the water outlet.

8. The water discharge device as claimed in claim 7, wherein a positioning gasket is mounted between the three-way main body and the knob for sealing and connecting the three-way main body and the knob, and the valve core front cover is mated with and fixed to the knob through a rotating gasket.

9. The water discharge device as claimed in claim 8, wherein the positioning gasket is formed with a plurality of indication grooves, a ball spring is mounted to the knob, and one end of the ball spring is connected to a ball.

10. The water discharge device as claimed in claim 1, wherein one end of the iron push rod, facing the gasket, has a plastic plug.

* * * * *